United States Patent
Myers

[11] Patent Number: 5,561,250
[45] Date of Patent: Oct. 1, 1996

[54] METHOD AND APPARATUS FOR MEASURING GRAIN MASS FLOW RATE IN HARVESTERS

[76] Inventor: Allen Myers, R.R. 2, Ames, Iowa 50010

[21] Appl. No.: 250,928

[22] Filed: May 31, 1994

Related U.S. Application Data

[62] Division of Ser. No. 716,293, Jun. 17, 1991, Pat. No. 5,343,761.

[51] Int. Cl.$^6$ ........................................................ G01F 1/00
[52] U.S. Cl. ........................................................ 73/861.73
[58] Field of Search ................................. 73/73, 861.71, 73/861.72, 861.73; 324/689, 694

[56] References Cited

U.S. PATENT DOCUMENTS

| | | | |
|---|---|---|---|
| 4,168,466 | 9/1979 | Boldt | 324/689 |
| 4,584,522 | 4/1986 | Varela | 73/73 |
| 4,765,190 | 8/1988 | Strubbe | 73/861.73 |
| 4,853,614 | 8/1989 | Carver | 324/689 |
| 4,868,491 | 9/1989 | Black | 324/694 |
| 5,065,632 | 11/1991 | Reuter | 73/861.73 |

Primary Examiner—Richard Chilcot
Assistant Examiner—Ronald Biegel
Attorney, Agent, or Firm—Kent A. Herink, Esq.; Brian J. Laurenzo, Esq.; Davis, Brown, et al.

[57] ABSTRACT

A system and method for continuously measuring mass flow rate of grain in a harvester where an impact plate is disposed to be impacted by grain exiting a power driven conveyor which is a normal part of the harvester. The impact plate is mounted on force measuring apparatus which generates an electrical signal proportional to grain impact force. Computing apparatus in electrical communication with the force measuring apparatus calculates the average value of grain impact force, adjusts this value to compensate for the difference between an actual measured operating speed of the conveyor and a constant reference speed, and calculates grain mass flow rate utilizing a mass flow calibration characteristic which relates grain mass flow rate to average grain impact force, where this calibration characteristic is non-linear and has different values for different grain types and different grain moisture contents. Optionally, the operating speed of the conveyor is calculated by analyzing the signal received from the force measuring apparatus to determine a characteristic frequency which is directly proportional to operating speed. Also optionally, electrodes are mounted on the impact plate for generating an electrical signal which is indicative of grain moisture content, and this electrical signal is used in combination with a moisture calibration characteristic to determine grain moisture content. Harvester travel speed is measured and the area rate of harvesting is calculated by multiplying this speed by a preset swath width. Instantaneous crop yield is computed by dividing grain mass flow rate by area harvesting rate. Total weight of grain harvested and total field area harvested are calculated by integrating grain mass flow rate and area rate of harvesting, respectively. Electronic display apparatus displays measured and calculated values to the harvester operator, while an electronic memory device stores calculated values from multiple field areas. Optionally, the memory device is removable from the grain mass flow measuring system on a harvester to provide convenient transfer of data to a remote computing device.

24 Claims, 10 Drawing Sheets

FIG. 9
FIG. 9A
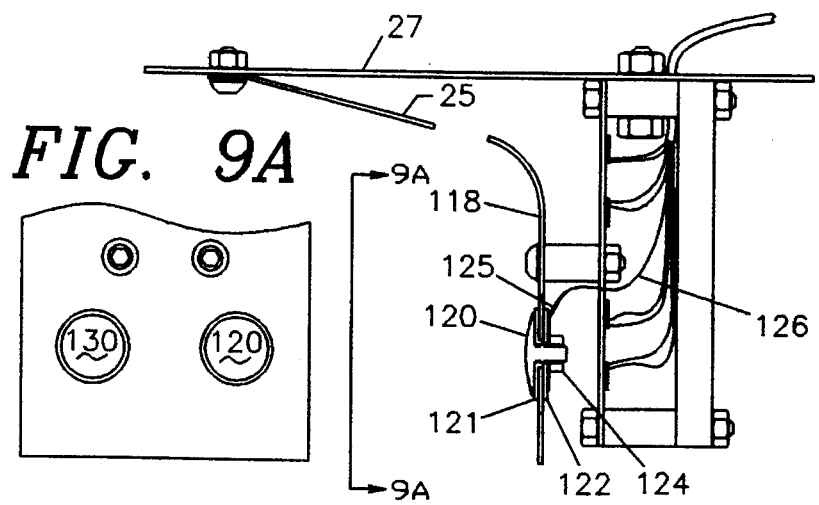
FIG. 10
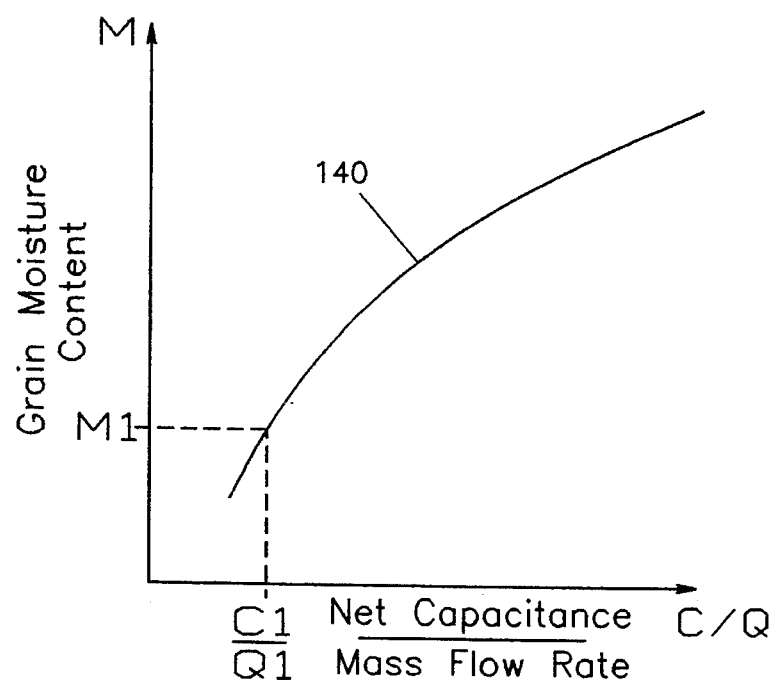

METHOD AND APPARATUS FOR MEASURING GRAIN MASS FLOW RATE IN HARVESTERS

This application is a continuation application of Ser. No. 07/716,293, filed Jun. 17, 1991, now U.S. Pat. No. 5,343,761.

FIELD OF THE INVENTION

The present invention relates to means for measuring mass flow rate of granular material by utilizing an impact type flow sensor to measure material flow rate from the outlet of a conveying mechanism such as a paddle type chain conveyor. More specifically, the present invention relates to means for continuously measuring grain mass flow rate in a harvester as grain is harvested.

BACKGROUND OF THE INVENTION

Methods for measuring instantaneous crop yield as a grain harvester is moving through a field of grain have been the subject of both research studies and prior inventions. Methods for measuring either the volumetric flow rate or the mass flow rate of grain have been used to provide a grain flow rate signal which can be used to calculate either the total weight of grain harvested within a given field area or the instantaneous yield of the crop at the present location of the harvester in the field. These data are useful to the agricultural producer to allow measuring the effect of different soil conditions or crop growing practices on crop yield. Total weight of grain is calculated by integrating grain mass flow rate versus time. Instantaneous crop yield is calculated by dividing instantaneous grain mass flow rate by the instantaneous rate at which the harvester is harvesting the field area. For example, instantaneous grain mass flow rate in bushels per hour divided by instantaneous rate of harvesting the field area in acres per hour provides instantaneous crop yield in bushels per acre.

Numerous methods have been designed to measure the flow rate of grain on harvesters. However, none of the previous methods have been fully practical in terms of providing a simple method of continuously measuring grain mass flow rate while harvesting.

Impact type mass flow rate sensors for particulate or granular materials are well known in the art and are widely used in stationary installations such as material processing plants. Typical examples are disclosed in U.S. Pat. Nos. 3,640,135, 4,440,029 and 4,718,284, among others. All of these devices utilize the principle of creating a reaction force proportional to material mass flow rate by changing the velocity of a stream of granular material as it strikes an impact plate at a known initial velocity. Further, these devices are drop type sensors where granular material is dropped onto an impact plate from a known height above the plate. While providing the height required for a drop type sensor is very practical in many stationary applications due to large size of the associated processing equipment, providing sufficient drop height to obtain an accurate grain mass flow rate measurement on a harvester is much less practical.

U.S. Pat. No. 4,407,380 describes one of several types of devices which have been developed to measure flow rate of grain as it exits the outlet of the grain storage tank unloading auger of a harvester. However, use of such devices to continuously measure grain flow rate while harvesting is impractical, since such use would require continuous operation of the unloading auger of the harvester and movement of a grain hauling vehicle with the harvester throughout the field.

U.S. Pat. No. 4,765,190 describes a grain mass flow rate sensor which is installed at the outlet of the clean grain elevator of a harvester and utilizes the momentum of grain exiting the clean grain elevator to continuously measure grain mass flow rate during harvesting. However, this device is not an impact type sensor, since the speed of the grain is not significantly reduced by contact with the sensing plate. Instead, the curved sensor plate changes the direction of flow of the stream of grain, creating a centrifugal force which is measured. Although this sensor construction is used to minimize the effect of friction between grain and the sensing plate on the measured force, said construction is also more complex than that of a simple impact type mass flow rate sensor.

U.S. Pat. Nos. 4,063,456 and 4,719,805 recognize the need to compensate for the effect of variations in speed of granular material striking an impact plate, and thus propose means for measuring either the speed of the conveyor or of the granular material. While the systems disclosed in these patents can achieve high accuracy by compensating for speed variations, they both require additional sensing devices to obtain a speed measurement.

Since the agricultural producer receives payment for grain based on a standard trading moisture content, the weight of grain with moisture content exceeding the standard must be corrected to represent the weight of the grain after drying to standard moisture content. Therefore, to obtain maximum accuracy of measuring true crop yield, it is desired to provide means for automatically and continuously measuring moisture content of the grain as it is harvested. U.K. patent 2,087,704 describes means for automatically measuring moisture content of grain in conjunction with a device for measuring the volume rate of grain flow on a harvester. However, the proposed moisture measuring device is complex, because it requires the addition of a grain trapping chamber separate from the flow rate measuring means to insure exposure of a known amount of grain to the moisture measuring device.

Whatever the precise merits, features and advantages of the above cited devices, it will be seen that none of them provides all of the objects of the present invention.

SUMMARY OF THE INVENTION

An object of the present invention is to provide new and novel means for continuously measuring grain mass flow rate on a harvester as grain is harvested.

Another object of the present invention is to provide means for measuring grain mass flow rate directly, rather than indirectly through measurement of grain volumetric flow rate and subsequent conversion to mass flow rate utilizing grain density.

A further object of the present invention is to provide means for measuring grain mass flow rate by utilizing a device which is simple in construction, which is small in size, and where installation of said device does not require significant modification of the harvester.

A further object of the present invention is to provide means for measuring grain mass flow rate which obtains high accuracy of measurement by compensating for errors which can occur due to grain moisture variations, operating speed variations, and non-linear relationships between the measured flow indicating value and actual grain mass flow rate.

A further object of the present invention is to provide means for utilizing an electrical signal obtained from a grain mass flow rate sensor to continuously calculate instantaneous crop yield as grain is harvested.

A further object of the present invention is to provide simple means for continuously measuring moisture content of grain as it is being harvested.

A further object of the present invention is to provide means for calculating, storing and displaying useful data which is calculated based on measured values of grain mass flow rate, harvester travel speed and grain moisture content.

A further object of the present invention is to provide convenient means for transferring stored yield and area data from a monitor mounted on a harvester to a computing device which is located at a remote location.

The foregoing objects of the present invention are provided by a system including a grain mass flow rate sensor which utilizes the linear momentum imparted to grain by the clean grain elevator of a harvester as grain exalts said elevator. Since the clean grain elevator operates continuously while harvesting to lift grain from the lower grain collection point on the harvester to the grain storage tank of the harvester, placement of the grain mass flow rate sensor at the exit of said elevator provides continuous measurement of grain mass flow rate while harvesting.

A vertical impact plate is mounted in the path of grain exiting the clean grain elevator. The impact plate stops the horizontal motion of grain striking it, thus changing the linear momentum of the grain and causing a reaction force to be exerted on the impact plate which is generally proportional to grain mass flow rate. This impact force is measured and is used in combination with a flow calibration characteristic, which relates grain mass flow rate to average impact force, to calculate grain mass flow rate.

Since the impact plate is intended to be mounted within the structure of existing harvesters with minimal modifications to the harvester structure, the width of the impact plate is less than the full width of the clean grain elevator to insure sufficient clearance to avoid lodging of grain or foreign material between the edges of the impact plate and the harvester structure.

The impact plate is mounted on a load beam, on which strain gauges are mounted to provide electrical measurement of the force exerted on the impact plate by grain. Placement of the impact plate and load beam within a grain collection area near the outlet of the clean grain elevator allows the grain mass flow rate sensor to be mounted within the existing structure of the harvester, minimizing harvester modifications required for installation of the sensor.

To provide maximum accuracy of measuring grain impact force, the load beam and strain gauges are configured to measure only forces perpendicular to the face of the impact plate. This configuration avoids errors resulting from variations in the position at which grain strikes the impact plate. Preferably, the load beam is configured as a cantilever beam which is fixed at both ends and has the impact plate attached at its center. Also preferably, four strain gauges are mounted on the surface of the load beam which faces away from the impact plate, with these strain gauges positioned and electrically connected in a four arm bridge so that the output of the bridge is sensitive only to forces perpendicular to the impact plate.

Electronic means continuously amplifies and filters the output of the strain gauge bridge. This amplified signal, which varies directly with force on the impact plate, is averaged over a finite time period, such as 1 second. The zero force offset value of the amplified signal is subtracted from the average value of said signal to provide a net value which is directly proportional to impact force. This net value is multiplied by a force calibration factor, which has been pre-determined for the particular load beam and signal conditioning circuit, to provide the actual value of average impact force.

Since the force exerted by grain on the impact plate repeatedly rises and falls as the paddles of the clean grain elevator chain discharge their individual quantities of grain against the impact plate, the amplified force signal is averaged over a time period corresponding to an integer number of time periods between the passing of paddles of the clean grain elevator chain, to insure that the resulting average value accurately represents average impact force. The time period between passing of successive paddles of the clean grain elevator chain is calculated from the actual measured operating speed of the clean grain elevator.

Electronic calculating means provides conversion of the average impact force measured by the load beam into grain mass flow rate based on a flow calibration characteristic for the particular clean grain elevator and impact plate configuration. The use of a non-linear flow calibration characteristic provides high accuracy of grain mass flow rate measurement by compensating for non-linearities in the relationship between grain mass flow rate and average force exerted by grain on the impact plate.

To further improve accuracy of mass flow rate measurement, the flow calibration characteristic relating mass flow rate to average impact force has different values for different levels of grain moisture content, to compensate for variations in grain impact force which occur with different values of grain moisture content for a given grain mass flow rate.

Moisture content of the grain may be measured or estimated by the harvester operator and entered into the computing means through an operator interface. Optionally, means to continuously measure grain moisture content are provided integral with the grain mass flow rate sensor. The preferred method of measuring grain moisture content is to measure the capacitance existing between two electrodes which are mounted on the impact plate. The measured capacitance is used in combination with the measured mass flow rate and a moisture calibration characteristic to calculate grain moisture content. Preferably, the measured capacitance is divided by the measured grain mass flow rate to obtain a normalized capacitance value which is independent of grain mass flow rate and can be used in combination with a moisture calibration characteristic to determine grain moisture content.

To yet further improve accuracy of mass flow rate measurement, the calculation of mass flow rate includes a method of compensating for the effect of variations in grain impact force for a given mass flow rate which occur due to variations in actual operating speed of the clean grain elevator. The preferred method of implementing this compensation is to adjust the measured impact force value by multiplying it by a constant reference operating speed for the particular clean grain elevator, and subsequently dividing the result by the actual operating speed of the clean grain elevator. This method produces an adjusted force value which is representative of the force which would have been measured had the clean grain elevator been operating at the reference speed. This adjusted force value is then used with flow calibration characteristics which have been pre-determined for the reference speed.

Means to measure the actual speed of the clean grain elevator chain are provided. In one embodiment of the present invention, a pulse type speed sensor is utilized with a cooperating toothed wheel to measure the operating speed of a shaft which rotates at a speed proportional to the speed of the clean grain elevator chain. In another embodiment of the present invention, the frequency of occurrence of the impact force pulses measured on the impact plate are used to calculate the actual operating speed of the clean grain elevator.

To further improve accuracy of grain mass flow rate measurement, the upper sprocket of the clean grain elevator is positioned so that the outer tips of the paddles of the clean grain elevator chain operate at a small and substantially constant clearance from the inside surface of the clean grain elevator housing. This configuration provides minimum grain flow turbulence by limiting the mount of grain which bypasses the tips of the clean grain elevator paddles as they rotate around the top of the chain sprocket and throw grain toward the impact plate. If the inside surface of the clean grain elevator housing is not a constant radius, an insert is mounted inside the clean grain elevator housing to provide a substantially constant radius.

Since adjustment of the position of the upper sprocket of the clean grain elevator is normally used to remove slack in the clean grain elevator chain, while the position of this sprocket must be fixed to maintain constant paddle tip clearance, alternate means to remove slack from the chain are provided. This means is provided by a mechanism for adjusting the position of the sprocket at the inlet or lower end of the clean grain elevator. The preferred means of adjusting the position of the lower sprocket is to provide a movable bearing holder for the shaft on which the lower sprocket is mounted.

Means to measure the travel speed of the harvester through a field of grain is provided. Travel speed of the harvester is multiplied by the swath width at which the harvester is gathering crop, producing an instantaneous measurement of rate of harvesting the field area. Instantaneous grain mass flow rate is divided by instantaneous rate of harvesting field area to provide an instantaneous value of crop yield for the particular location of the harvester within the field.

Calculating means for integrating grain mass flow rate and rate of harvesting field area versus time are provided for calculating the total weight of grain and the total field area harvested. Average crop yield for the field is calculated by dividing total weight of grain by field area. Calculations are performed on instantaneous grain mass flow rate, instantaneous crop yield, total grain weight and average crop yield values to correct them for actual grain moisture content other than the standard moisture content used for trading purposes. Said values are modified to indicate the values which would have been measured had the actual grain moisture content been at the standard trading moisture content.

An operator Interface is provided to allow the harvester operator to set values for calibration constants, such as those appropriate for the particular harvester, and to set values for operating variables such as swath width and grain moisture content.

Display means are provided to display one or more measured or calculated values to the harvester operator. The values displayed are selectable by the harvester operator through use of the operator interface.

Electronic or magnetic memory means are provided for storing measured and calculated data values. Data from one or more fields may be stored in memory, allowing harvesting of new fields to continue while data from previous fields is retained in memory for future use. Means are provided in the operator interface to allow the harvester operator to identify the start of a new field, thus ending accumulation of data for the previous field. Means are also provided for subdividing fields into multiple loads to allow recording crop yield for portions of a given field.

Optionally, the use of a very large memory means provides storage of all calculated instantaneous crop yield values for subsequent use in constructing yield maps for each field, said yield maps identifying lines of constant yield values within the field areas or areas of the fields where crop yield falls within defined ranges. Construction of such maps also requires storage of values representing the position of the harvester in the field corresponding to each crop yield value which is stored. Although it is anticipated that the present invention will be used with harvester position measuring means to provide data for yield maps, means for measurement of harvester position is not included in the present invention.

Optionally, an electronic or magnetic memory means is removable from the electronic monitor which is mounted on a harvester, to allow reading the memory contents with a device such as a personal computer at a location remote from the harvester.

These and other objects and advantages of the present invention, as well as details of illustrative embodiments will be more fully understood from the drawings and the detailed description of the invention.

BRIEF DESCRIPTION OF THE DRAWINGS

FIG. 9 and FIG. 9A illustrate an alternate embodiment of the grain mass flow rate sensor of FIG. 3 which further includes electrodes for measuring grain moisture content.

FIG. 10 is a graphical representation of a moisture calibration characteristic which relates grain moisture content to the capacitance measured between the electrodes mounted on the impact plate of the grain mass flow rate sensor of FIG. 9.

DETAILED DESCRIPTION OF THE INVENTION

Figure 1:
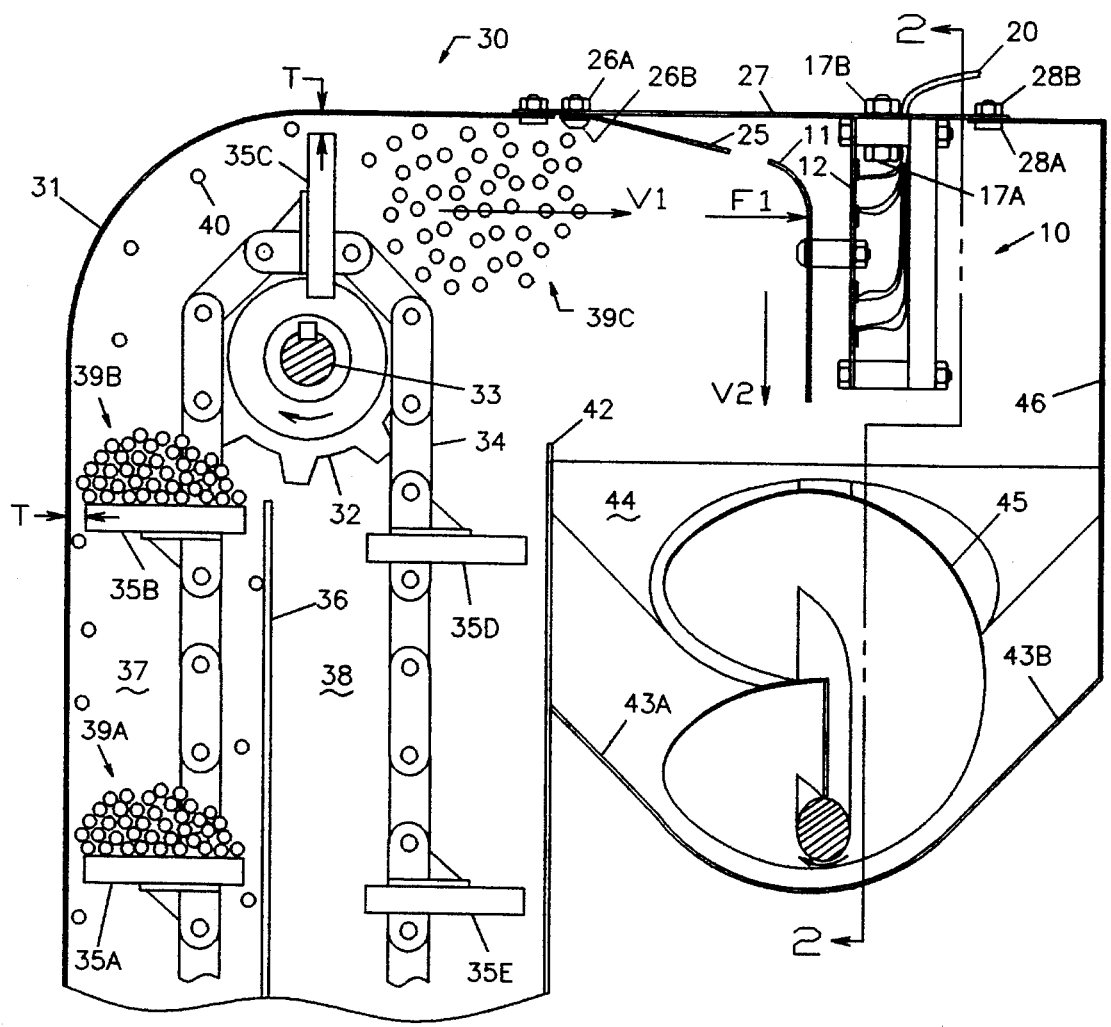
FIG. 1 is a vertical cross section through the upper or outlet end of the clean grain elevator of a typical harvester, with a grain mass flow rate sensor installed in the grain collection area near the outlet of the elevator.

Referring first to FIG. 1, a grain mass flow rate sensor generally designated as 10 is positioned at the outlet of a harvester's clean grain elevator, which is generally designated as 30. Clean grain elevator 30 includes an elevator housing 31 and a chain sprocket 32 which rotates with shaft 33 to drive conveyor paddle chain 34, which wraps around sprocket 32 and to which are attached paddles 35A–35E for lifting grain from the inlet or lower end of clean grain elevator 30 to the outlet or upper end of clean grain elevator 30. Paddles 35A–35E are attached to links of clean grain elevator chain 34 at regular intervals, such as every fourth link as shown. Clean grain elevator 30 is divided into compartments 37 and 38 by divider plate 36. Sprocket 32 rotates clockwise as viewed, causing paddles 35A–35E to life quantities of grain such as 39A and 39B upward within compartment 37. When the chain link to which a paddle such as 35C is connected contacts sprocket 32, the chain link and paddle rotate about shaft 33, imparting generally horizontal motion to a quantity of grain such as 39C, causing grain to exit clean grain elevator 30 into collection area 44. After discharging a quantity of grain into collection area 44, paddles such as 35D and 35E travel downward within compartment 38 to the lower end of clean grain elevator 30, where they subsequently pick up new quantities of grain and lift them within compartment 37. Collection area 44 includes sloped lower surfaces 43A and 43B which cause grain to collect around grain storage tank loading auger 45, which is a screw type auger which conveys grain from collection area 44 into the grain storage tank of the harvester.

Grain mass flow rate sensor 10 includes an impact plate 11 which is attached to load beam 12. A quantity of grain such as 39C initially travels with generally horizontal velocity V1 toward impact plate 11. Upon striking impact plate 11, the horizontal motion of quantity of grain 39C is stopped and the grain subsequently falls into collection area 44 with final velocity V2, which is generally vertical. The change in the horizontal component of velocity of quantity of grain 39C from V1 to substantially zero corresponds to a change in horizontal momentum of this quantity of grain which is proportional to both the mass of quantity of grain 39C and initial velocity V1. A force F1, which is proportional to the change of momentum of quantity of grain 39C, is created on impact plate 11 and is measured by load beam 12.

Grain mass flow rate sensor 10 is attached to collection area cover 27 by fasteners such as screw 17A and nut 17B. Collection area cover 27 is a standard component of the harvester which has been modified to accept attachment of grain mass flow rate sensor 10. Collection area cover 27 is attached to clean grain elevator housing 31 and collection area wall 46 by fasteners such as screws 28A and nut 28B.

The upper end of impact plate 11 is spaced downward from collection area cover 27 sufficiently to prevent lodging of material other than grain, such as pieces of stalks or cobs which may be present in the grain, in the space between impact plate 11 and collection area cover 27. Deflector plate 25 is attached to collection area cover 27 with fasteners such as screw 26A and nut 26B. Deflector plate 25 deflects some of the individual kernels of quantity of grain 39C so that these kernels are not thrown into the space above impact plate 11. The right end of deflector plate 25 is also spaced a sufficient distance from the upper end of impact plate 11 to prevent lodging of foreign material between these plates. The upper portion of impact plate 11 is curved toward the approaching grain to minimize flow of grain upward over the top of impact plate 11.

Figure 2:
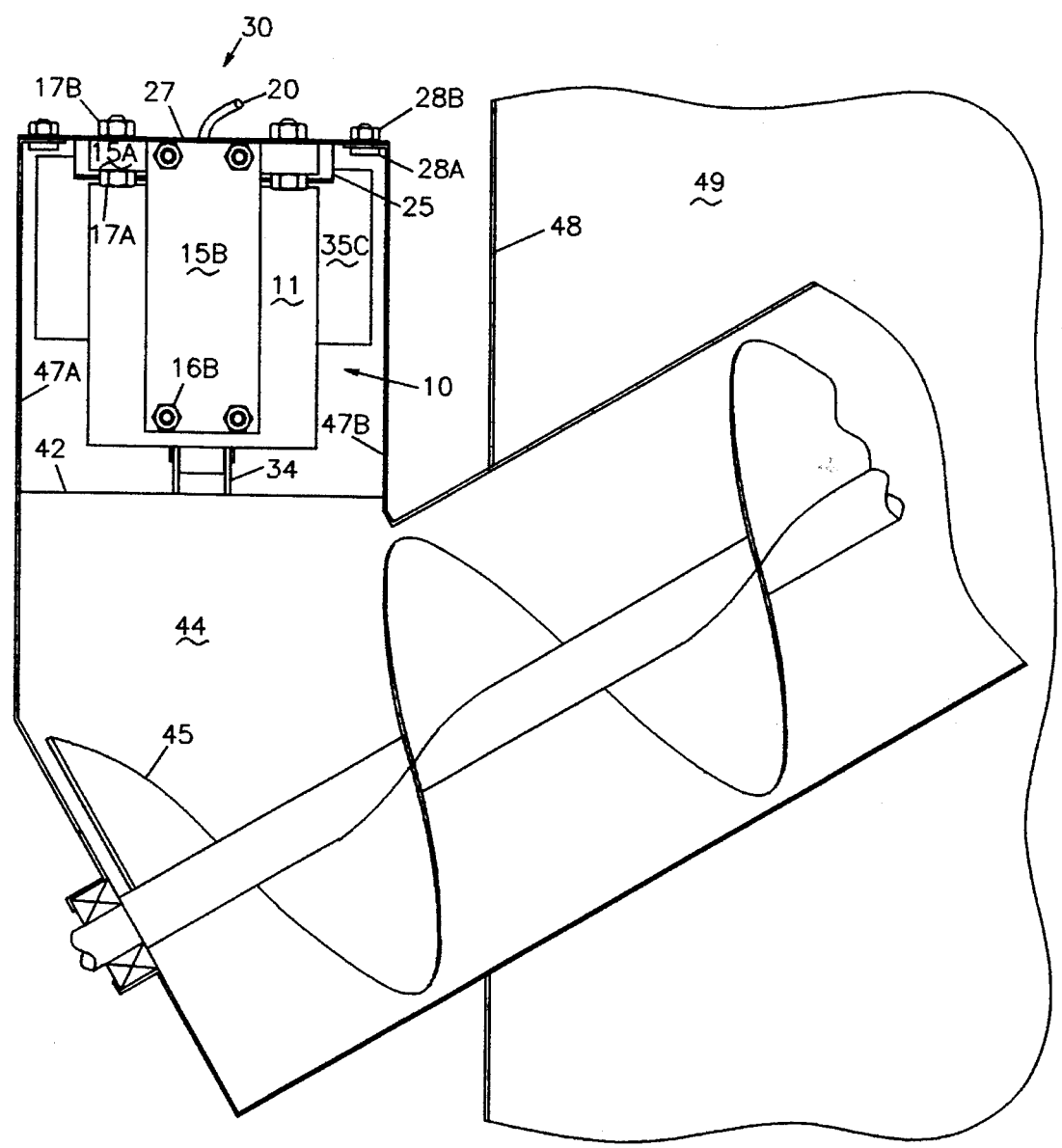
FIG. 2 is a vertical cross section taken along the line 2—2 of FIG. 1.

Referring now to FIG. 2, paddle 35C is seen partially hidden behind impact plate 11. Outer clean grain elevator wall 47A and inner clean grain elevator wall 47B are closely spaced to the left and right ends of paddles such as 35C to minimize bypassing of individual kernels of grain past the paddles in the spaces between walls 47A and 47B and the ends of the paddles. The left and right edges of impact plate 11 are spaced sufficient distances from clean grain elevator walls 47A and 47B to prevent lodging of material other than grain in the spaces between said edges and said walls. Grain storage tank loading auger 45 operates in collection area 44. Auger 45 angles upward to convey grain from collection area 44 through grain storage tank wall 48 to a point near the center of grain storage tank 49.

Figure 3:
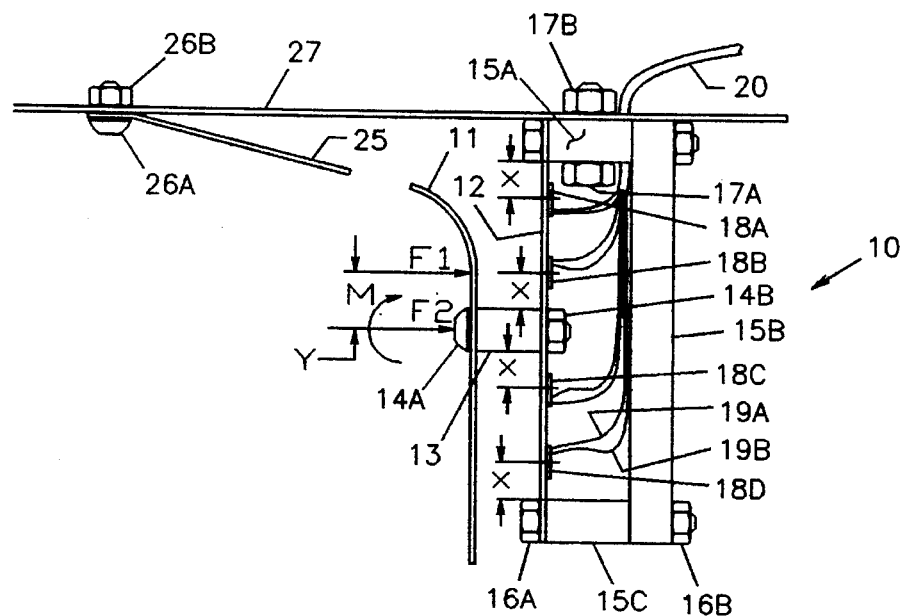
FIG. 3 is a detailed side view of the grain mass flow rate sensor of FIG. 1.

Referring now to FIG. 3, grain mass flow rate sensor 10 includes impact plate 11 which is attached to load beam 12 by spacer 13 and fasteners such as screw 14A and nut 14B. Load beam 12 is clamped at its ends to a supporting structure consisting of support members 15A–15C by fasteners such as screw 16A and nut 16B. Support member 15A is attached to collection area cover 27 by fasteners such as screw 17A and nut 17B.

Four strain gauges 18A–18D are bonded to the surface of load beam 12 which faces away from impact plate 11. Placement of strain gauges 18A–18D on this surface protects them from impact by grain or foreign material which may bounce over the top of impact plate 11. Strain gauges 18A–18D each have two leadwires such as 19A and 19B which are connected to remote signal conditioning circuitry through multi-conductor electrical cable 20. Each of strain gauges 18A–18D is placed an equal distance X from the clamped portions of load beam 12 at the ends and at the center of the load beam. Force F1 acting perpendicular to load beam 12 at a distance Y from the center of the load beam is equivalent to an equal force F2 acting at the center of the load beam in combination with moment M, which is equal to F1 multiplied by Y. Force F2 induces equal magnitudes of strain in all four strain gauges 18A–18D, with strain in gauges 18A and 18D being compressive and strain in gauges 18B and 18C being tensile. Moment M also induces equal strain magnitudes in all four strain gauges 18A–18D which are superimposed on the strains resulting from force F2. However, moment M induces compressive strain in gauges 18A and 18C while inducing tensile strain in gauges 18B and 18D. Strain gauges 18A–18D are electrically connected in a four arm bridge network in a manner so that only force F1 is measured and the effect of moment M, which is a function of distance Y, is not measured. It is advantageous to eliminate the effect of moment M on the net electrical signal obtained from the strain gauge bridge because distance Y varies as the mass flow rate of grain from the clean grain elevator varies. This arrangement of strain gauges 18A–18D in the four arm bridge also eliminates the effect of any component of force F1 which is parallel to load beam 12, such force existing if the direction of force F1 is not exactly perpendicular to load beam 12.

Figure 4A:
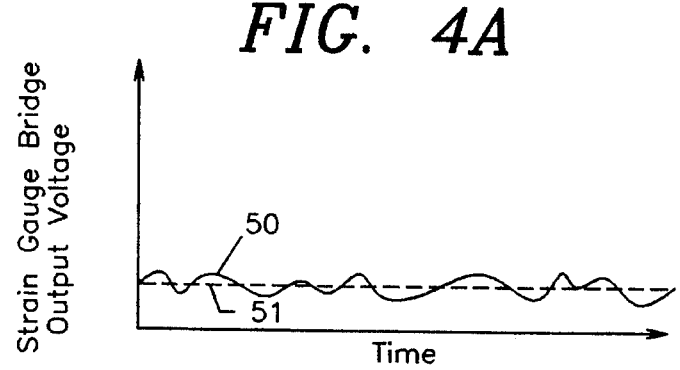
FIGS. 4A–4B are graphical representations of typical electrical signals obtained from the strain gauge bridge on the load beam of the grain mass flow rate sensor of FIGS. 1–3.
Figure 4B:
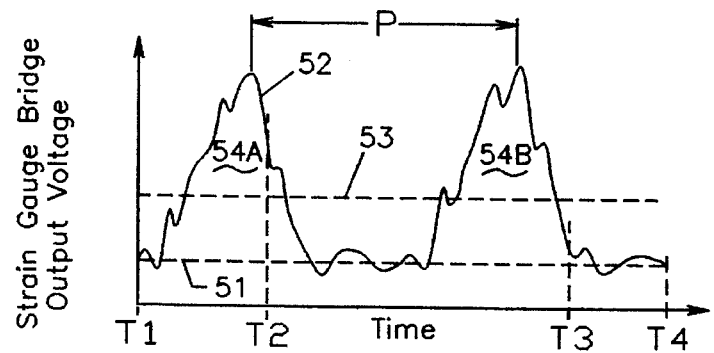

Referring now to FIGS. 4A and 4B, the method of measuring force F1 on impact plate 11 by utilizing the signal obtained from the four arm bridge comprising strain gauges 18A–18D is described. FIG. 4A illustrates bridge output voltage 50 obtained from the strain gauge bridge versus time when the clean grain elevator is operating with no grain flow. Bridge output voltage 50 is not steady, but oscillates due to vibration induced by operation of the harvester. However, since there is no grain flow, it is known that the average value of force F1 due to grain striking the impact plate 11 is zero. Therefore, average zero voltage 51, which is the average value of bridge output voltage 50, corresponds to the zero level of force F1. Means is provided in the associated electronic circuitry to average bridge output voltage 50 over a time interval of at least one second when there is no grain flow from the dean grain elevator to allow determination of average zero voltage 51, the value of which is stored in the associated electronic circuitry for use in calculating the average value of force F1 when the clean grain elevator is conveying grain.

FIG. 4B illustrates strain gauge bridge output voltage 52 obtained when the clean grain elevator is conveying grain. Pulses such as 54A and 54B occur periodically in bridge output voltage 52 when individual quantities of grain strike the impact plate. The period P of the pulses in bridge output voltage 52 is determined by the speed and the paddle spacing of the clean grain elevator chain of the particular harvester, and is typically in the range of 0.06 to 0.10 second. Since average zero voltage 51 corresponds to zero force F1 on the impact plate, the instantaneous value of force F1 is proportional to the difference between bridge output voltage 52 and average zero voltage 51. The proportionality between force F1 and bridge output voltage 52 is a constant scale factor for the particular load beam and electronic circuit which is determined prior to installation of the grain mass flow rate sensor in the harvester by calibrating the load beam with a known force.

Over a relatively short but finite period of time such as 1 second, average grain mass flow rate from the clean grain elevator is calculated from the average value of force F1. The average value of force F1 existing over a finite time period can be calculated by integrating the instantaneous value of F1, calculated as described above, over the time interval and dividing the result by the length of the time interval. Alternately, the average value of force F1 can be calculated by multiplying the unit force per unit voltage scale factor for the load beam by the difference between average bridge voltage 53 and average zero voltage 51. Average bridge voltage 53 is the average value of bridge output voltage 52 over a time interval which includes several output voltage pulses such as 54A and 54B.

Average bridge voltage 53 can be obtained by heavy analog signal filtering of bridge output voltage 52. However, such filtering requires time constants on the order of several seconds to reduce signal ripple to a sufficiently small value, inducing an undesirable time lag in the measurement of impact force. In the preferred embodiment of the present invention, an amplified signal which is proportional to bridge output voltage is sampled several hundred times per second and is recorded over a time interval of about 1 second. Average bridge voltage 53 is then calculated by computing the average of the recorded values. The stored value for average zero voltage 51 is then subtracted from the computed value of average bridge voltage 53, and the difference is multiplied by a predetermined scale factor to compute the average value of impact force F1.

The value obtained for average bridge voltage 53 is dependent on the duration of the time interval over which bridge output voltage 52 is averaged. Time interval T1–T4 is equal to twice the time period P between passage of successive paddles of the clean grain elevator chain. Averaging bridge output voltage 52 over time interval T1–T4 provides the correct value for average bridge voltage 53. However, it is readily seen that averaging bridge output voltage 52 over time period T1–T3, which is not an integer multiple of time period P, will produce a higher value of average bridge voltage 53, because the portion of bridge output voltage 52 omitted during time period T3–T4 is less than average bridge voltage 53. Conversely, averaging bridge output voltage 52 over time period T2–T4 will produce a lower value of average bridge voltage 53. To provide maximum accuracy of measuring the average value of force F1 while limiting the time interval over which bridge output voltage 52 is averaged to obtain average bridge voltage 53, bridge output voltage 52 is averaged over a time period equal to an integer number multiplied by time period P. The actual value of time period P is calculated from the measured actual speed of the clean grain elevator chain. Of course the number of time periods P used for averaging bridge output voltage 52 can be any integer number and is not limited to the value of two used for illustration in FIG. 4B.

Bridge output voltage 52 can also be used to calculate the actual operating speed of the clean grain elevator. Since the paddles of the clean grain elevator chain are attached to this chain at fixed intervals, time period P between passing of successive paddles is inversely proportional to the operating speed of the clean grain elevator. Time period P can be calculated by determining the times at which the peaks of pulses such as 54A and 54B occur, and subsequently calculating and averaging several values for time period P. Alternately, a mathematical algorithm such as a Fourier Transform may be applied to a finite time record of bridge output voltage 52 to determine the frequency of occurrence of pulses such as 54A and 54B, said frequency being directly proportional to the operating speed of the clean grain elevator.

Figure 5:
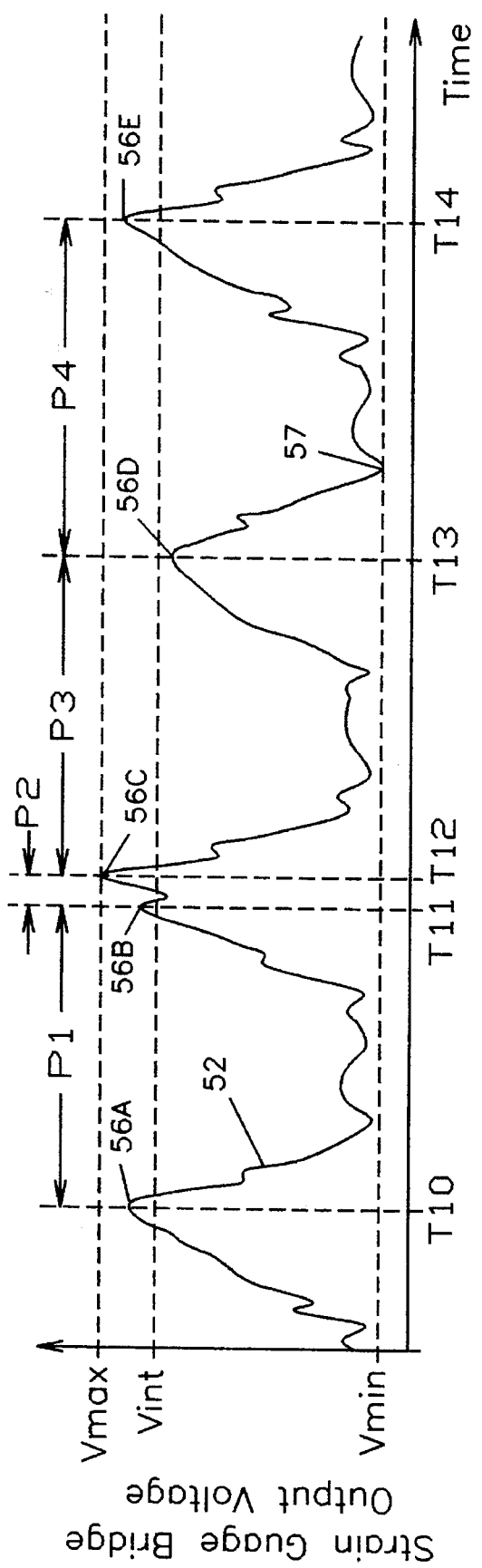
FIG. 5 is a graphical representation of values used in computing the operating speed of the clean grain elevator from the electrical signal obtained from the strain gauge bridge of the grain mass flow rate sensor of FIGS. 1–3.

FIG. 5 illustrates a longer time record of strain gauge bridge output voltage 52 which will be used to illustrate the preferred method of computing clean grain elevator speed from voltage 52. Over a finite time period such as that shown in FIG. 5, voltage 52 is sampled and recorded at a frequency high enough to provide good definition of the waveform of voltage 52. A period containing four grain impact pulses as shown would typically contain between 100 and 200 samples. Maximum voltage Vmax, occurring at peak 56C, and minimum voltage Vmin, occurring at valley 57, are first computed by finding the maximum and minimum values of the samples stored for voltage 52 over this time period. An intermediate voltage Vint is then calculated to be a predefined percent, such as approximately 20% shown, of the difference between Vmax and Vmin below Vmax. The sampled values of voltage 52 are then inspected in the order that they were recorded to find the time locations of peaks existing above the level of Vint. Five peaks 56A–56E are shown occurring at times T10–T14 respectively. These peaks are found by determining the time at which the maximum value of voltage 52 occurs after voltage 52 rises above Vint, but before it subsequently drops below Vint. Time periods P1–P4 are then obtained by computing the difference between the time occurrences of peaks 56A–56E. Assuming that correct values have been obtained for periods P1–P4, their average will be computed and used to calculate operating speed of the clean grain elevator.

However, for the waveform of voltage 52 shown in FIG. 5, peaks 56B and 56C represent the same grain impact pulse, resulting in an undesired small period P2 and incorrect values for periods P1 and P3. Also, peak 56D is below Vint and will be missed, resulting in periods P3 and P4 being incorrectly combined. Therefore means to detect and correct these errors are required. Since the clean grain elevator for a given harvester operates within a relatively narrow range of speed during harvesting, the approximate value of the impact pulse period is known. Therefore, any time periods with a very small value such as P2 can safely be assumed to be due to double peaking as shown at 56B and 56C. When such periods are detected, they will be eliminated and one half of their value will be added to both the preceding and following periods. In FIG. 5, this will result in values for P1 and P3 which would have been computed had voltage 52 peaked only once at a time halfway between peaks 56B and 56C. Similar logic is also used in the event that more than two peaks are detected during a single grain impact pulse. Excessively large periods, such as the combination of P3 and P4 resulting from not detecting peak 56D, can be tested to see if they are close to an integer number of normal periods such as P1 and P3. If this is the case, these large periods can be divided by the integer number to approximate the periods which would have been found if the missing peak or peaks had been detected.

It is also possible for peaks to be correctly detected at periods significantly smaller or larger than normal due to removal or addition of links at one location in the clean grain elevator chain for the purpose of adjusting slack in the chain. Many harvesters have the paddles of the clean grain elevator chain spaced four chain links apart. It is common to operate with one set of paddles spaced either five or three links apart due to addition or removal of a link at the point where the two ends of the chain are joined to make an endless chain loop. Such paddle spacing will produce periods which are nominally 125% or 75% of the normal period for a paddle spacing of four links. Therefore, after correction for multiple and missed peaks, any periods which are close to those which would be expected with greater or smaller than standard paddle spacing must either be ignored or corrected by the ratio of the apparent paddle spacing difference. After all corrections have been made, all periods should be within 10% or less of each other. Any values which cannot be corrected by the above logic to meet this criteria are not used in the calculation of clean grain elevator speed.

Figure 6A:
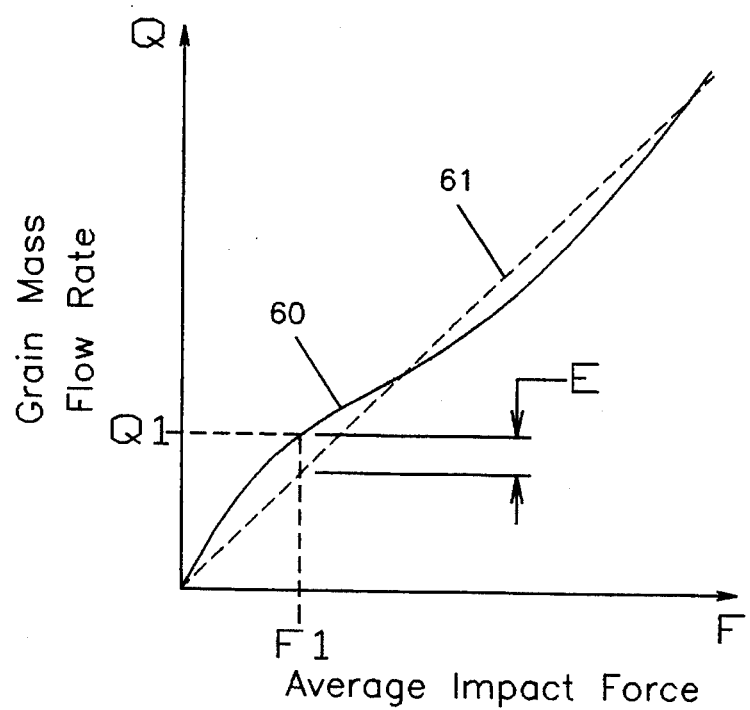
FIGS. 6A–6B are graphical representations of typical flow calibration characteristics which relate grain mass flow rate to the average impact force exerted by grain on the impact plate of the grain mass flow rate sensor of FIGS. 1–3.

FIG. 6A illustrates a typical flow calibration characteristic for the grain mass flow rate sensor 10 of FIGS. 1–3. Characteristic curve 60 relates average mass flow rate Q to average impact force F exerted by grain on the impact plate. Although the relationship between Q and F is generally linear, it is not exactly linear. Obtaining high accuracy of mass flow rate measurement requires that a non-linear flow calibration characteristic curve such as line 60 be used to calculate grain mass flow rate Q, rather than using a simple linear relationship between mass flow rate Q and average force F such as line 61, which is a linear approximation of curve 60. Flow calibration characteristic curve 60 must be built into or pre-programmed into the associated electronic circuitry. As an example of use of characteristic curve 60, a measured average force of F1 is used to predict a grain mass flow rate of Q1. However, if the linear characteristic line 61 were used to predict mass flow rate, the predicted flow rate would be in error by the amount E shown in FIG. 6A.

Flow calibration characteristic curve 60 is determined experimentally by measuring average impact force F versus grain mass flow rate Q for a particular clean grain elevator and impact plate configuration. For maximum accuracy of mass flow rate measurement, different flow calibration characteristic curves are obtained for different grain types and different grain moisture contents. These flow calibration characteristics are each stored in the associated electronic circuitry, and the appropriate characteristic is selected based on grain type and moisture content.

Figure 6B:
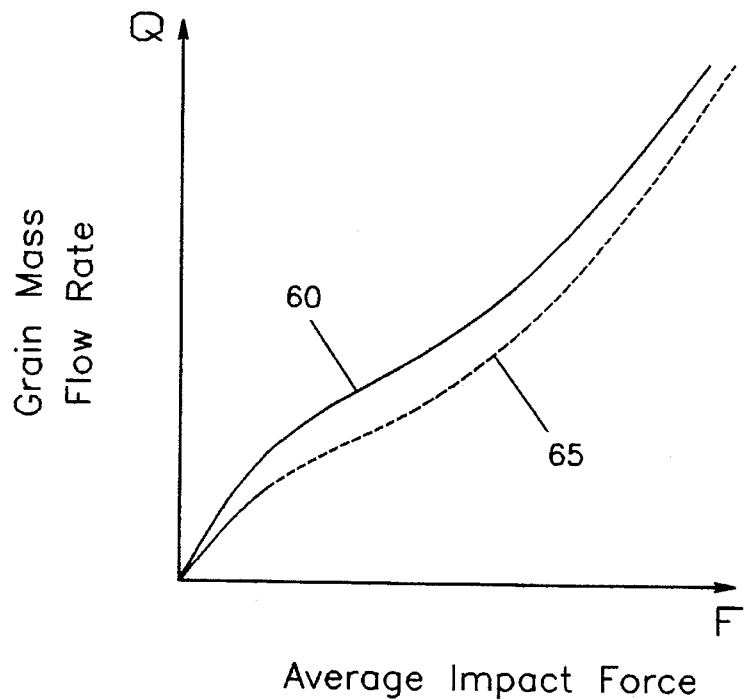

FIG. 6B illustrates a difference in flow calibration characteristics resulting from a difference in grain moisture content. Characteristic curves 60 and 65 represent flow calibration characteristics determined for low and for high grain moisture contents respectively. Since it is not practical to determine a flow calibration characteristic for every possible grain moisture content which the harvester can encounter, the electronic circuitry interpolates between two characteristic curves such as 60 and 65 when it is required to calculate grain mass flow rate for an intermediate moisture content.

As mentioned with reference to FIG. 1, impact force F1 exerted on impact plate 11 is substantially proportional to initial velocity V1 of quantity of grain 39C, while V1 is in turn substantially proportional to the speed of paddle 35C of clean grain elevator chain 34. Therefore, variations in the speed of clean grain elevator chain 34 will result in substantially proportional variations in force F1 for a given mass flow rate. Flow calibration characteristic curves such as 60 and 65 of FIG. 6B are established for a constant reference speed of rotation of clean grain elevator sprocket 32, and thus for constant speed of clean grain elevator chain 34. Since actual speed of clean grain elevator sprocket 32 will vary slightly from the reference speed during field operation of a harvester due to varying loading of the harvester's engine, obtaining high accuracy of grain mass flow rate measurement requires that the calculation of mass flow rate include adjustment for the effect of actual operating speed which may be different from the reference speed. Although different calibration characteristics could be determined for different operating speeds and used in the same manner as different calibration characteristics for different moisture contents, this method would significantly increase the complexity of calculating mass flow rate when combined with the use of different calibration characteristics for different grain moisture contents. A much simpler method of implementing the required correction is to adjust the value of measured impact force F1 based on the difference between measured operating speed and the reference speed of the clean grain elevator. A particularly simple yet effective method for performing this adjustment is to multiply the measured impact force F1 by the reference speed and to divide the result by the actual operating speed to obtain an adjusted value for force F1 which is substantially equal to the value which would have been measured with actual operating speed equal to the reference speed. This adjusted value of force F1 is then used with one or more flow calibration characteristics, such as curves 60 and 65 of FIG. 6B, to calculate grain mass flow rate Q1.

To further improve accuracy of calculating grain mass flow rate Q1 from force F1 on the impact plate, it is advantageous to minimize the effect of grain moisture content on the flow calibration characteristic. Referring again to FIG. 1, it has been determined that the effect of grain moisture content on the flow calibration characteristic can be minimized by positioning sprocket 32 so that clearance T between the outer tips of the paddles 35A–35E and clean grain elevator housing 31 is substantially constant as the paddles move from the position of paddle 35B to the position of paddle 35C. If the inside surface of clean grain elevator housing 31 is a constant radius of the proper size as shown in FIG. 1, the vertical position of sprocket 32 can be adjusted to keep paddle tip clearance T substantially constant. Maintaining small paddle tip clearance T minimizes bypassing of grain past the tips of the paddles as grain is thrown outward against clean grain elevator housing 31 by centrifugal force. It is further believed that grain which bypasses the tips of the paddles, such as individual grain kernel 40, as the paddles rotate from the left side to the top side of sprocket 32, has a reduced velocity and a different trajectory into collection area 44 than does grain which does not bypass the paddles. Since grain with low moisture content has less intergranular friction and flows more easily than does grain with high moisture content, it is believed that a larger percentage of grain bypasses the tips of the paddles with low moisture content than does with high moisture content. Therefore, minimizing paddle tip clearance T minimizes this effect by reducing the amount of grain which can bypass the paddles.

Figure 7:
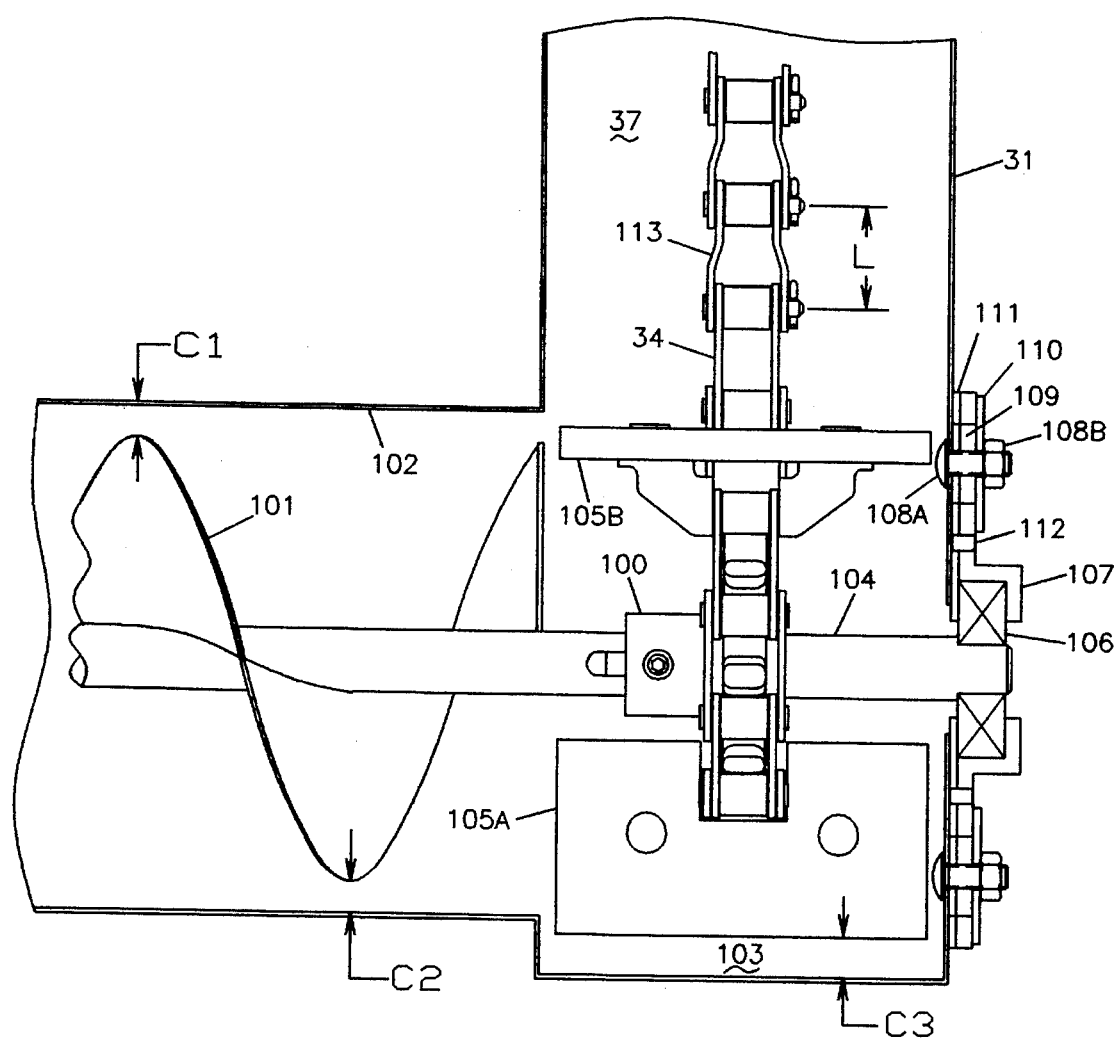
FIG. 7 is a vertical cross section through the lower or inlet end of a typical clean grain elevator, illustrating means for removing slack from the clean grain elevator chain by vertical movement of the lower chain sprocket.

On most harvesters, excessive slack is removed from clean grain elevator chain 34 by adjusting the vertical position of shaft 33 and thus sprocket 32. However, maintaining substantially constant paddle tip clearance T requires that shaft 33 be fixed at the vertical position which provides constant clearance. To provide means for removing slack from chain 34, an adjustment mechanism is provided for changing the vertical position of the sprocket at the lower or inlet end of the clean grain elevator. Referring now to FIG. 7, the preferred embodiment of a lower sprocket adjustment means is illustrated. The portion of clean grain elevator chain 34 which is shown is moving upward and would be lifting quantities of grain in compartment 37 if grain were being conveyed by the clean grain elevator. Lower sprocket 100 is driven by chain 34, and in turn drives auger 101 through shaft 104. Auger 101 turns within auger housing 102 to move grain rightward from the separating mechanism of the harvester into lower collection area 103, where it is picked up by clean grain elevator chain paddles such as 105A and 105B. Shaft 104 rotates in bearing 106 which would normally be mounted in fixed relationship to clean grain elevator housing 31. However, in the case of the present invention bearing 106 is mounted within movable bearing holder 107, which is adjustable in the vertical direction because it is attached to clean grain elevator housing 31 with fasteners such as screw 108A and nut 108B which pass through slots such as 109 in bearing holder 107. Removal of excess slack from chain 34 is obtained by loosening nuts 108B and moving bearing holder 107 downward until slack in the chain is removed, and subsequently tightening nuts 108B against washers 110 to retain bearing holder 107 in position relative to clean grain elevator housing 31. Bearing 106 is positively retained in bearing holder 107 by plate 111, which is attached to the bearing holder by pins such as 112.

As the vertical position of bearing holder 107 is adjusted, clearances C1, C2 and C3 vary. To prevent contact of auger 101 against auger housing 102 or paddle 105A against clean grain elevator housing 31, the length of slot 109 is limited to a value which insures that clearances C1, C2 and C3 cannot become zero. Of course the limited length of slot 109 limits the amount of chain slack adjustment which is available with movement of bearing holder 107. Chain 34 gradually lengthens during operation, requiring periodic downward adjustment of bearing holder 107. When the bearing holder reached the lower limit of its adjustment, a chain link such as 113 must be removed, which shortens the total length of chain 34 by chain pitch length L and raises sprocket 100 and bearing holder 107 a distance equal to one half of L. To insure that chain slack can always be taken up within the limits of movement of bearing holder 107, the sum of C1 plus C2 and the sum of C1 plus C3 must each be greater than one half of length L. These relationships can be met without modification of most harvesters. Vertical adjustment of bearing holder 107 introduces slight angularity of shaft 104, since the bearing at the other end of this shaft is not adjusted vertically. However, the long length of shaft 104 and the small mount of movement allowed by bearing holder 107 limit the angularity to a very small value, such as 0.5 degrees maximum, which is easily accommodated by slight deflection of the harvester structure to which the bearings are mounted.

Figure 8:
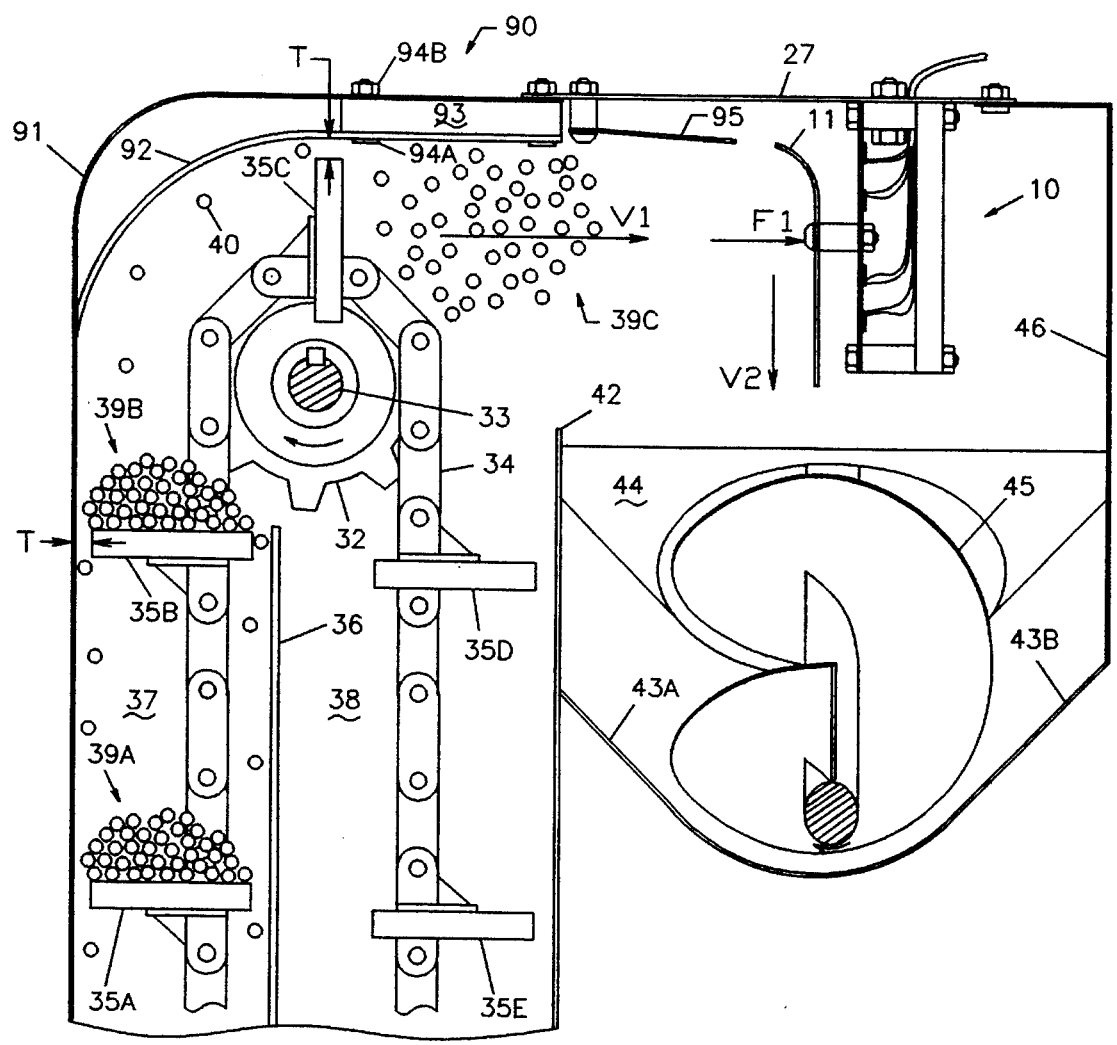
FIG. 8 is similar to FIG. 1, but alternately illustrates the use of an insert inside the clean grain elevator housing to provide a constant radius surface to maintain constant tip clearance of the clean grain elevator chain paddles.

Referring now to FIG. 8, a clean grant elevator 90 with a slightly different configuration from that of FIG. 1 is illustrated. In FIG. 8, clean grain elevator housing 91 does not have the proper radius to maintain constant paddle tip clearance T as paddles 35A–35E rotate from the left side to the top side of sprocket 32. Therefore, a constant radius insert 92 is mounted inside clean grain elevator housing 91 with fasteners such as screw 94A and nut 94B. Also, the vertical position of shaft 33 and sprocket 32 are adjusted to provide substantially constant paddle tip clearance T as the paddles move from the position of paddle 35B to the position of paddle 35C. The addition of constant radius insert 92 allows obtaining the benefits of constant paddle tip clearance T on a harvester where clean grain elevator housing 91 does not have the proper shape. Constant radius insert 92 is shown spaced downward from the top of clean grain elevator housing 91 by spacer 93. This spacer can be used to position constant radius insert 92 downward to obtain the desired paddle tip clearance if it is not possible to adjust the vertical position of sprocket 32 to a high enough vertical position. Also, spacing constant radius insert 92 downward reduces deflection of the trajectory of the grain by deflector 95, which further reduces the effect of grain moisture content on the flow calibration characteristic by reducing the friction force between the grain and deflector 95. Minimizing this friction force reduces the effect of grain moisture content on the flow calibration characteristic because grain friction characteristics vary with grain moisture content.

Referring now to FIG. 9 and FIG. 9A, optional means for measuring the moisture content of grain which contacts the impact plate of the grain mass flow rate sensor is described. Electrodes 120 and 130 are mounted on modified impact plate 118, but are electrically isolated from the impact plate by non-conductive washers such as 121 and 122, and are retained against these washers and the impact plate by threaded nuts such as 124. Electrically conductive terminals such as 125 are clamped under the threaded nuts to provide connection to an electrical leadwire such as 126 for each electrode. Electrodes 120 and 130 are each connected through individual leadwires such as 126 to remote signal conditioning circuitry. Electrodes 120 and 130 act as the plates of a capacitor, while the free space in front of the electrodes and the grain which is striking the impact plate act as the dielectric material of this capacitor. The capacitance value of the capacitor formed by electrodes 120 and 130 and the associated dielectric material increases in approximate proportion to both the amount of grain which is near the electrodes and the moisture content of the grain, as is well known in the design of capacitive type grain moisture testers. The remote signal conditioning electronics excites electrodes 120 and 130 with high frequency voltage signals so that a measuring circuit can determine the capacitance existing between these electrodes. The value of the measured capacitance is then used to calculate grain moisture content based on a predetermined moisture calibration characteristic.

With no grain striking impact plate 118, the capacitance existing between electrodes 120 and 130 has a non-zero value, since the free space surrounding the electrodes has a small but finite dielectric value. This capacitance, plus stray capacitance existing between the leadwires such as 126, produces a baseline value of capacitance which is measured when there is no grain flow. Since only the increase in capacitance which is caused by grain near the electrodes is representative of grain moisture content, the baseline capacitance must be subtracted from the measured capacitance to produce a net capacitance which is used to calculate grain moisture content. The remote electronic circuitry has means to store the baseline capacitance value which is measured with no grain flow, so that this baseline capacitance value can subsequently be subtracted from capacitance values which are measured when grain is flowing.

Since the capacitance measured between electrodes 120 and 130 increases as both the amount of grain near the electrodes and the moisture content of the grain increase, the method of computing moisture content must include means to compensate for the amount of grain near the electrodes. This amount of grain is generally proportional to grain mass flow rate. Therefore, to obtain a value which is highly indicative of grain moisture content, the net increase in capacitance measured between electrodes 120 and 130 is divided by calculated grain mass flow rate, and the resulting value is used in conjunction with a moisture calibration characteristic to calculate grain moisture content. FIG. 10 illustrates a moisture calibration characteristic curve 140 for a particular type of grain. For a net measured capacitance of C1 and a calculated grain mass flow rate of Q1, the value of the quotient C1/Q1 is used to determine a point on curve 140 from which grain moisture content M1 is determined. Curve 140 will have different values of M relative to C/Q for different types of grain.

Although the preferred method of measuring grain moisture is by capacitive means, it is also possible to use the resistance characteristics of grain, which also vary with grain moisture content. To use resistance characteristics, the current flowing between electrodes 120 and 130 would be measured with a constant voltage potential between them. Calculation of grain moisture content would be performed in a manner similar to the capacitive method described above.

Figure 11:
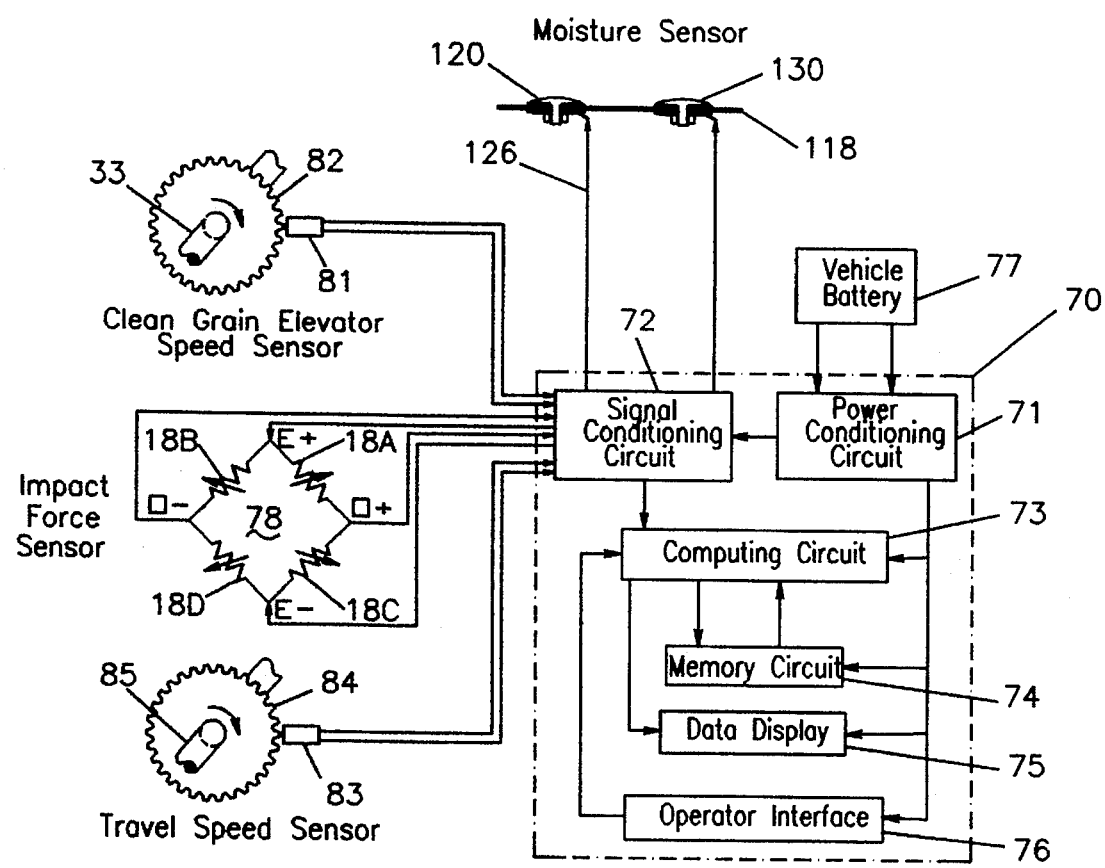
FIG. 11 is a schematic diagram of a complete system for measuring grain mass flow rate, harvester travel speed and grain moisture content; and for computing, storing and displaying the measured values or other useful data which are computed from said values.

Referring now to FIG. 11, a diagram of a complete grain mass flow measuring system of the present invention is illustrated. An electronic monitor, generally indicated as 70, includes power conditioning circuit 71, signal conditioning circuit 72, computing circuit 73, memory circuit 74, data display 75 and operator interface 76. Signal conditioning circuit 72 includes excitation and sensing means for strain gauge bridge 78, shaft speed sensors 81 and 83, and moisture sensing electrodes 120 and 130. Strain gauges 18A–18D, which are bonded to load beam 12 of FIG. 1, are shown schematically in FIG. 11 to illustrate the method of electrical connection which provides measurement of only the force perpendicular to impact plate 11 of FIG. 1. The system of FIG. 11 also includes shaft speed sensors 81 and 83, as well as cooperating toothed wheels 82 and 84, which are used to measure the actual speeds of clean grain elevator shaft 33 and of shaft 85 which rotates at a speed proportional to travel speed of the harvester.

Although the power, signal conditioning, computing and memory circuits are shown as part of monitor 70 which is remote from the sensing devices, it is also possible and within the scope of this invention to mount some or all of these circuits at the sensing devices. For example, it may be advantageous to minimize the effect of stray capacitance in leadwires such as 126 by mounting part of signal conditioning circuit 72 near moisture sensing electrodes 120 and 130.

Power conditioning circuit 71 is supplied with electrical power from electrical system battery 77 of the harvester. This power conditioning circuit protects the remaining circuitry of electronic monitor 70 from harmful transients and supplies one or more regulated constant voltages which are required by the other circuits.

Strain gauge bridge 78 includes strain gauges 18A–18D which are bonded to the load beam of the mass flow rate sensor. Bridge 78 is energized by a constant voltage differential, E+ minus E–, which is supplied from signal conditioning circuit 72. The arrangement of the strain gauges in bridge 78 is such that the output differential voltage, 0+ minus 0–, is proportional only to forces perpendicular to the load beam and impact plate. Signal conditioning circuit 72 amplifies and filters the output differential voltage of bridge 78 and provides a conditioned signal to computing circuit 73.

Signal conditioning circuit 72 amplifies bridge output voltage 0+ minus 0– to a level which is accurately measurable by computing circuit 73, since this differential voltage is very small, in the range of 5 millivolts maximum. Circuit 72 also filters out unwanted high frequency noise from the amplified signal to reduce problems with the peak detection logic described with reference to FIG. 5. A multi-pole filter is used to substantially reduce oscillations in the amplified signal which are at frequencies higher than about 40 Hz.

Signal conditioning circuit 72 also filters and amplifies signals from pulse type speed sensors 81 and 83 which are used to provide alternating voltage signals with frequencies proportional to the speeds of rotation of the respective shafts 33 and 85. Toothed wheels 82 and 84 have multiple protruding teeth which generate alternating voltages in speed sensors 81 and 83 as these teeth pass by the speed sensors. Toothed wheel 84 can be mounted directly on a wheel of the harvester or it can be mounted on a shaft in the driving means for the drive wheels of the harvester. It is also possible to eliminate toothed wheel 84 and speed sensor 83 by using alternate means for measuring harvester travel speed, such as a radar speed sensor which directly measures the speed of the harvester structure relative to the surface of the field. It is also possible to eliminate toothed wheel 82 and speed sensor 81 by calculating clean grain elevator speed from the impact force signal measured by the load beam, as has been described with reference to FIG. 5.

Signal conditioning circuit 72 also provides high frequency voltage excitation of moisture sensing electrodes 120 and 130 through leadwires such as 126, and also includes circuitry for measuring the value of capacitance existing between the electrodes and for providing a signal indicative of this value to computing circuit 73.

Computing circuit 73 can be implemented with either analog or digital electronics, but the preferred method is digital due to the superior computational capabilities of digital computing devices such as micro-processors. Computing circuit 73 calculates useful data based on the signals received from signal conditioning circuit 72 which represent force on the impact plate, clean grain elevator speed, harvester travel speed and grain moisture content. This data can be stored in memory circuit 74 for later retrieval, and can be displayed immediately to the harvester operator on data display 75. Examples of useful data which are calculated for storage and display are as follows:

1. Clean grain elevator speed is calculated from the signal received from clean grain elevator speed sensor 81, or alternatively from the impact force signal received from strain gauge bridge 78.
2. Average force exerted by grain on the impact plate is calculated from the signal received from strain gauge bridge 78, and is adjusted using calculated clean grain elevator speed.
3. Grain mass flow rate is calculated using the adjusted average impact force value in combination with one or more pre-defined flow calibration characteristics.
4. Harvester travel speed is calculated from the signal received from travel speed sensor 83 or alternate travel speed sensing means.
5. Field harvesting rate is calculated by multiplying harvester travel speed by a pre-defined swath width which the harvester cuts or gathers as it passes through the field.
6. Instantaneous crop yield is calculated by dividing instantaneous grain mass flow rate by instantaneous field harvesting rate.
7. Total weight of grain harvested is calculated by integrating grain mass flow rate versus time.
8. Total distance travelled is calculated by integrating harvester travel speed versus time, or by maintaining a count of total pulses received from travel speed sensor 83.
9. Total area harvested is calculated by integrating field harvesting rate versus time, or by multiplying total distance travelled by the harvester's swath width.
10. Average crop yield is calculated by dividing the total weight of grain harvested by the corresponding field area from which it was harvested.
11. Grain moisture content is calculated using the measured capacitance increase at electrodes 120 and 130 divided by the most previously calculated grain mass flow rate in combination with a moisture calibration characteristic. This value of moisture content is subsequently used to determine the flow calibration characteristic to be used for the next mass flow calculation.

One or more of the above values, as well as other data not mentioned, can be displayed on data display 75. The mount of data displayed is limited only by the size of the particular display device used.

The mount of grain harvested or the yield of the crop may be calculated based on either actual grain weight or the adjusted weight which the grain would have if its moisture content were equal to the standard trading moisture content for the particular type of grain. To perform this weight correction, actual moisture content of the grain must be known. If optional moisture sensing electrodes 120 and 130 are not used, the harvester operator must manually measure or estimate grain moisture content and enter this value using operator interface 76.

It is also advantageous to use memory circuit 74 to store data such as total area, total grain weight and average crop yield from previously harvested field areas. The amount of previously computed data which can be saved is limited only by the data storage capacity of memory circuit 74, which can be made quite large. With a sufficiently large memory circuit 74, it is also possible to store all calculated values of instantaneous crop yield for use in generating yield maps which show spatial variation of crop yield within each field.

Operator interface 76 includes manually operable devices such as switches which allow the harvester operator to perform functions such as selecting the type of data to be displayed on data display 75, entering calibration parameters, and managing the data stored in memory circuit 74.

Figure 12:
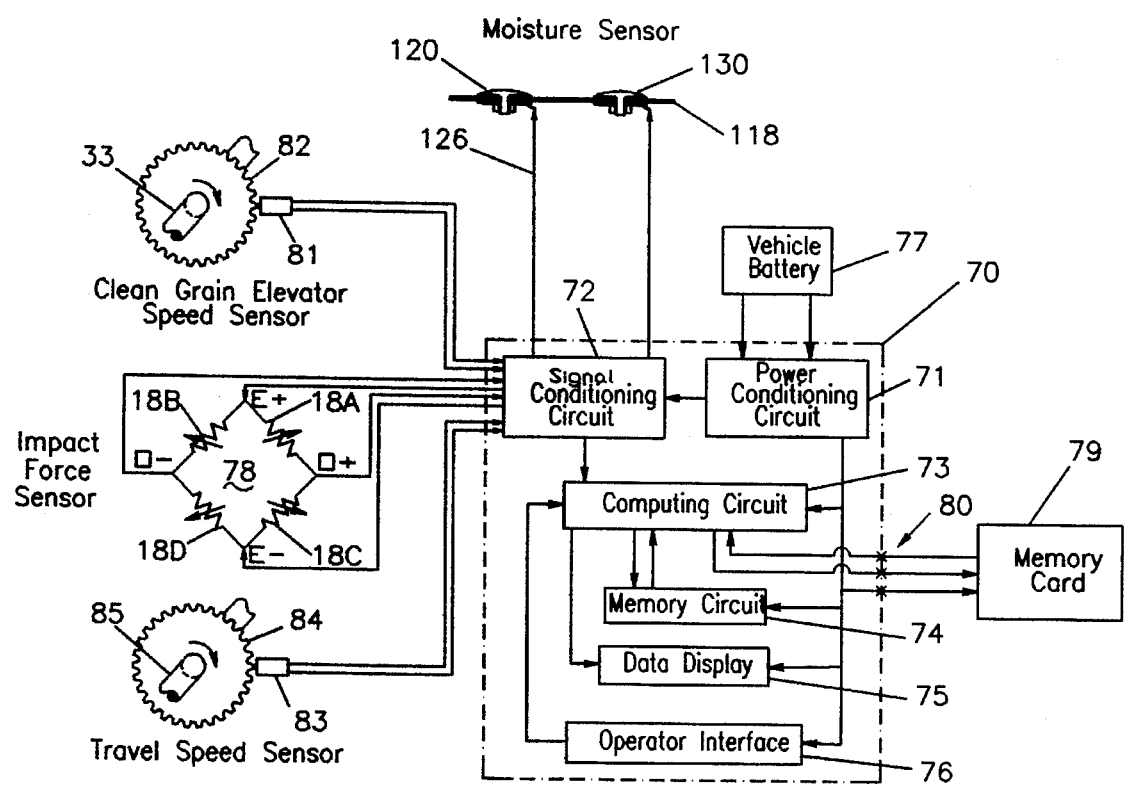
FIG. 12 is a schematic diagram of an alternate embodiment of the system of FIG. 11 including a removable memory card for transport of stored data from the harvester to a remote computer.

FIG. 12 illustrates an alternate embodiment of the system of FIG. 11 where a removable memory device is provided, the preferred form of which is a removable memory card 79. The harvester operator can remove this memory card from monitor 70, which is mounted on the harvester, and transport it to a remote location for reading yield and area data which is stored on the memory card. Memory card 79 is a removable miniaturized memory circuit which is approximately the size of a credit card. An example of a commercially available memory card is the Mitubishi Melcard, which is currently available in memory capacities up to 2 megabytes. The primary advantage of the use of a removable memory card is that Wansport of card 79 from monitor 70 to a personal computer at a remote location allows rapid transfer of data stored by the monitor during harvesting to the personal computer, without the need to physically connect the monitor to the personal computer. A copy of the data can then be stored on the personal computer for safekeeping, and the personal computer can be used to print a summary of the stored information. When large mounts of data are being stored for the purpose of subsequently constructing yield maps, memory card 79 provides a practical method of frequently transferring large amounts of data to a personal computer. Although less preferable due to poorer reliability in a potentially dusty environment, it is also possible to use a removable magnetic storage means such as a magnetic disk.

The electrical connections from monitor 70 to memory card 79 are implemented with a two piece electrical connector generally indicated as 80 in FIG. 12. One piece of this connector is mounted on monitor 70 while the mating piece of the connector is built into the memory card. Removal of the memory card from the monitor requires only grasping it by hand and pulling the card from the mating connector. Monitor 70 of FIG. 12 also contains an internal memory circuit 74, which provides storage for temporary data which is calculated during harvesting, but is not permanently stored and thus need not be stored on the memory card.

The foregoing description of the preferred embodiments of the present invention has been presented to illustrate a practical realization of the subject invention. It is not intended to be exhaustive or to limit the invention to the precise fore disclosed. Other embodiments are possible without departing from the scope of the invention, and it intended that the scope of the invention be limited only by the claims appended hereto.

I claim:

1. A system for measuring mean flow rate of grain exiting a power driven conveying means in a harvester, said system comprising an impact plate positioned to be impacted by grain exiting said conveying means, force measuring means for producing an electrical signal proportional to the impact force exerted on said impact plate by said grain, computing means in electrical communication with said force measuring means for calculating grain mass flow rate by averaging said impact force to obtain an average impact force and by utilizing a mass flow calibration characteristic which changes as a function of grain moisture content, and which relates said grain mass flow rate to said average impact force, and means to measure continuously the moisture content of said grain as it exits said conveying means.

2. The grain mass flow rate measuring system of claim 1 further comprising means to measure the actual operating speed of said conveyor, and wherein said computing means is operative to adjust said calculated grain mass flow rate to correct for the difference between said actual operating speed and a constant reference speed.

3. The grain mass flow rate measuring system of claim 2 wherein said computing means is operative to measure said actual operating speed by analyzing a finite time record of said electrical signal which is proportional to said impact force, to establish a characteristic frequency which is proportional to said actual operating speed.

4. The grain mass flow rate measuring system of claim 2 wherein said computing means further comprises means to adjust the value of said average impact force as a function of the difference between said actual operating speed and said constant reference speed, to obtain an adjusted value of said average impact force which is utilized with said mass flow calibration characteristic to determine said grain mass flow rate.

5. The grain mass flow rate measuring system of claim 4 wherein said means to adjust said average impact force comprises means to multiply said average impact force by the ratio of said constant reference speed to said actual operating speed, to obtain said adjusted value of average impact force which is utilized with said mass flow calibration characteristic to determine said grain mass flow rate.

6. The grain mass flow rate measuring system of claim 1 wherein said mass flow calibration characteristic comprises a non-linear characteristic which relates said calculated grain mass flow rate to said average impact force.

7. The grain mass flow rate measuring system of claim 1 wherein said means to measure said moisture content of said grain comprises two or more electrodes which are positioned near the flow path of said grain exiting said conveying means, wherein at least one of said electrodes is mounted on said impact plate, means to measure a characteristic electrical parameter existing between said electrodes, and means to calculate said moisture content by utilizing a moisture calibration characteristic which relates said moisture content to said characteristic electrical parameter.

8. The grain mass flow rate measuring system of claim 7 wherein said means to calculate said moisture content of said grain further comprises means to determine the difference in said characteristic electrical parameter from a condition of no grain flow to a condition of grain flow, and to utilize said difference in combination with said calculated value of grain mass flow rate and said moisture calibration characteristic to calculate said grain moisture content.

9. The grain mass flow rate measuring system of claim 1 wherein said conveying means is a paddle type chain conveyor, and wherein said means to determine said average impact force comprises means to average said impact force over a time period equal to an integer number multiplied by the time period existing between the passing of the paddles of said paddle type chain conveyor, past the position where said paddles eject quantities of said grain from said conveyor.

10. The grain mass flow rate measuring system of claim 9 wherein said impact plate has a width less than the width of the paddles of said paddle type chain conveyor.

11. The grain mass flow rate measuring system of claim 9 wherein the paddle chain of said paddle type chain conveyor operates inside a housing having a constant radius section and is wrapped about a sprocket, and wherein said sprocket is positioned so that the outer tips of the paddles of said paddle chain maintain a substantially constant clearance from the inner surface of said housing, as said paddles rotate from a position of lifting a quantity of grain to a position of ejecting said quantity of grain from said conveyor.

12. The grain mass flow rate measuring system of claim 9 wherein the paddle chain of said paddle type chain conveyor operates inside a housing and is wrapped about a sprocket, and further comprising a constant radius insert which is mounted within said housing equidistant from the axis of rotation of said sprocket so that the outer tips of the paddles of said paddle chain maintain a substantially constant clearance from the inner surface of said insert, as said paddles rotate from a position of lifting a quantity of grain to a position of ejecting said quantity of grain from said conveyor.

13. The grain mass flow rate measuring system of claim 9 wherein said paddle type chain conveyor further comprises means for adjusting the position of the chain sprocket about which the paddle chain of said conveyor is wrapped at the inlet end of said conveyor.

14. The grain mass flow rate measuring system of claim 13 wherein said means to adjust said position of said chain sprocket at said inlet end of said conveyor includes a bearing holder which can be fixed at any of a plurality of adjusted positions relative to the housing of said conveyor.

15. The grain mass flow rate measuring system of claim 1 wherein said force measuring means measures only forces which are perpendicular to the face of said impact plate.

16. A system for measuring mass flow rate of grain in a harvester as said grain exits a paddle type chain conveyor, wherein the paddle chain of said conveyor is wrapped about a first sprocket at the outlet end of said conveyor and operates inside a housing, said system comprising a constant radius insert which is mounted within said housing equidistant from the axis of rotation of said sprocket to provide a constant radius surface which is mounted within said housing equidistant from the axis of rotation of said first sprocket so that the outer tips of the paddles of said paddle chain maintain a substantially constant clearance from the inner surface of said insert, as said paddles rotate from a position of lifting a quantity of grain to a position of ejecting said quantity of grain from said conveyor, an impact plate positioned to be impacted by grain exiting said paddle type chain conveyor, force measuring means for producing an electrical signal proportional to the impact force exerted on said impact plate by said grain, and computing means in electrical communication with said force measuring means for calculating said grain mass flow rate by averaging said impact force to obtain an average impact force and by utilizing a mass flow calibration characteristic which relates said grain mass flow rate to said average impact force.

17. The grain mass flow rate measuring system of claim 16 wherein said paddle type chain conveyor further comprises means for adjusting the position of a second chain sprocket about which said paddle chain is wrapped at the inlet end of said conveyor.

18. The grain mass flow rate measuring system of claim 17 wherein said means to adjust said position of said second chain sprocket includes a bearing holder which can be fixed at any of a plurality of adjusted positions relative to the housing of said conveyor.

19. A method for measuring mass flow rate of grain exiting a power driven conveying means in a harvester, said method comprising the steps of positioning an impact plate to be impacted by grain exiting said conveying means, generating an electrical signal which is proportional to the impact force exerted on said impact plate by said grain, electrically connecting said force measuring means to computing means for computing said impact force from said electrical signal, calculating grain mass flow rate by averaging said impact force and utilizing the resulting average impact force in combination with a mass flow calibration characteristic which relates grain mass flow rate to average impact force, measuring the actual operating speed of said conveyor and adjusting said calculated grain mass flow rate to correct for the difference between said actual operating speed and a constant reference speed, and measuring continuously the moisture content of said grain as it exits said power driven conveying means.

20. The grain mass flow rate measuring method of claim 19 wherein said measurement of said actual operating speed comprises steps for analyzing said electrical signal which is proportional to said impact force to determine a characteristic frequency which is proportional to said actual operating speed.

21. The grain mass flow rate measuring method of claim 19 wherein said adjustment of said grain mass flow rate comprises steps to multiply said average impact force by the ratio of said constant reference speed to said actual operating speed, to obtain said adjusted value of average impact force which is utilized with said mass flow calibration characteristic to determine said grain mass flow rate.

22. The grain mass flow rate measuring method of claim 19 wherein said measurement of said moisture content of said grain comprises the steps of positioning two or more electrodes near the flow path of said grain exiting said conveying means, measuring a characteristic electrical parameter existing between said electrodes, and utilizing said measured characteristic electrical parameter with a moisture calibration characteristic which relates said grain moisture content to said characteristic electrical parameter, to calculate said moisture content.

23. The grain mass flow rate measuring method of claim 22 further comprising steps to determine the difference in said characteristic electrical parameter from a condition of no grain flow to a condition of grain flow, and to utilize said difference in combination with said calculated value of grain mass flow rate and said moisture calibration characteristic to calculate said grain moisture content.

24. The grain mass flow rate measuring method of claim 19 wherein said power driven conveying means is a paddle type chain conveyor and said average impact force is obtained by the steps of utilizing the actual operating speed of said conveyor to calculate the time period existing between the passing of the paddles of said conveyor past the position where said paddles eject quantities of said grain from said conveyor, multiplying said time period between passing of said paddles by an integer number to obtain an averaging time period, and averaging said impact force over said averaging time period to obtain said average impact force.

* * * * *